US012525740B2

(12) United States Patent
Gomez et al.

(10) Patent No.: US 12,525,740 B2
(45) Date of Patent: Jan. 13, 2026

(54) ELECTRICAL CONNECTOR WITH CAVITY PLUGS

(71) Applicant: Aptiv Technologies AG, Schaffhausen (CH)

(72) Inventors: Sergio Andres Villarreal Gomez, Saltillo (MX); Jorge Ivan Escamilla Rodriguez, Saltillo (MX); Pedro Yabur Pacheco, Saltillo (MX); Carlos Armando Gonzalez Delgadillo, Saltillo (MX)

(73) Assignee: Aptiv Technologies AG, Schaffhausen (CH)

( * ) Notice: Subject to any disclaimer, the term of this patent is extended or adjusted under 35 U.S.C. 154(b) by 338 days.

(21) Appl. No.: 18/226,365

(22) Filed: Jul. 26, 2023

(65) Prior Publication Data
US 2024/0106160 A1    Mar. 28, 2024

Related U.S. Application Data

(60) Provisional application No. 63/410,376, filed on Sep. 27, 2022.

(51) Int. Cl.
*H01R 13/52* (2006.01)
*H01R 13/424* (2006.01)
*H01R 43/02* (2006.01)

(52) U.S. Cl.
CPC ....... *H01R 13/5205* (2013.01); *H01R 13/424* (2013.01); *H01R 43/0207* (2013.01)

(58) Field of Classification Search
CPC .............. H01R 13/5205; H01R 13/424; H01R 43/0207

USPC ......................................................... 439/587
See application file for complete search history.

(56) References Cited

U.S. PATENT DOCUMENTS

| | | | | |
|---|---|---|---|---|
| 4,927,787 A | * | 5/1990 | Patel | H01R 13/501 439/189 |
| 5,634,807 A | * | 6/1997 | Saito | H01R 13/5208 439/589 |
| 6,028,268 A | * | 2/2000 | Stark | H02B 1/50 174/67 |
| 6,504,726 B1 | * | 1/2003 | Grabinger | H05K 1/0228 361/796 |
| 6,767,241 B1 | * | 7/2004 | Abel | H01R 24/64 439/417 |
| 7,112,090 B2 | * | 9/2006 | Caveney | H04Q 1/09 439/540.1 |
| 7,247,045 B1 | * | 7/2007 | Arellano | H01R 4/2408 439/717 |
| 7,288,001 B1 | * | 10/2007 | Aekins | H01R 4/2429 439/540.1 |

(Continued)

FOREIGN PATENT DOCUMENTS

WO    2010041099 A1    4/2010

*Primary Examiner* — Harshad C Patel
(74) *Attorney, Agent, or Firm* — Billion & Armitage

(57) ABSTRACT

A sealed electrical connector includes a seal retainer defining a plurality of wire openings, a compliant mat seal having a plurality of apertures, and a plug. The plug has a base inserted within one of the plurality of wire openings and a cylindrical post extending outwardly from the base that is inserted within one of the plurality of apertures. A method of manufacturing such a sealed electrical connector is also presented.

13 Claims, 3 Drawing Sheets

(56) References Cited

U.S. PATENT DOCUMENTS

| | | | |
|---|---|---|---|
| 7,367,850 B1 * | 5/2008 | Chang | H04Q 1/116 439/540.1 |
| 7,396,996 B1 * | 7/2008 | Shotey | H02G 3/14 174/67 |
| 7,554,037 B1 * | 6/2009 | Shotey | H02G 3/14 174/67 |
| 7,559,797 B2 * | 7/2009 | Shishikura | H01R 13/5208 439/587 |
| 7,568,958 B2 * | 8/2009 | Vigier | H01M 50/566 439/876 |
| 7,591,696 B1 * | 9/2009 | Munn | B26F 1/14 439/885 |
| 8,017,865 B1 * | 9/2011 | Baldwin | H02G 3/14 174/67 |
| 8,287,306 B2 * | 10/2012 | Daugherty | H01R 13/518 439/540.1 |
| 8,662,921 B2 | 3/2014 | Kataoka | |
| 9,437,959 B2 * | 9/2016 | Sathyanarayana | H01R 13/5213 |
| 9,935,436 B1 | 4/2018 | Baldwin | H02G 3/14 |
| 9,960,523 B2 * | 5/2018 | Kobayashi | H01R 13/502 |
| 10,044,132 B2 * | 8/2018 | Gagnon | H01R 13/502 |
| 10,164,353 B2 * | 12/2018 | Miki | H01R 13/521 |
| 10,199,814 B2 * | 2/2019 | Mortun | H02G 3/081 |
| 10,490,932 B1 * | 11/2019 | Schneider | H01R 13/582 |
| 10,490,988 B1 * | 11/2019 | Baldwin | H02G 3/083 |
| 10,666,030 B2 * | 5/2020 | Dinh | H02G 3/18 |
| 10,693,254 B2 * | 6/2020 | Obata | H01R 13/443 |
| 10,742,010 B1 * | 8/2020 | Baldwin | H02G 3/14 |
| 10,777,981 B1 * | 9/2020 | Baldwin | H02G 3/088 |
| 11,007,634 B1 * | 5/2021 | Tortorella, Jr. | B25H 3/02 |
| 11,031,738 B1 * | 6/2021 | Lin | H01R 12/58 |
| 11,334,121 B2 * | 5/2022 | Chen | G06F 1/1681 |
| 11,424,575 B2 * | 8/2022 | Wan | H01R 13/42 |
| 11,749,932 B1 * | 9/2023 | Brownell | H02G 3/14 439/67 |
| 2008/0223601 A1 * | 9/2008 | Johnson | H02G 3/088 174/67 |
| 2008/0296039 A1 * | 12/2008 | Dinh | H02G 3/12 174/53 |
| 2009/0071681 A1 * | 3/2009 | Junjie | H02G 3/088 174/66 |
| 2010/0078189 A1 * | 4/2010 | Leopold | H02G 3/088 174/67 |
| 2016/0164222 A1 * | 6/2016 | Thomas | H01R 13/52 439/144 |
| 2022/0052477 A1 * | 2/2022 | Sundarakrishnamachari | H01R 13/424 |
| 2024/0396250 A1 * | 11/2024 | Harrison | H01R 13/447 |

\* cited by examiner

ELECTRICAL CONNECTOR WITH CAVITY PLUGS

CROSS-REFERENCE TO RELATED APPLICATION

This application claims benefit of priority to U.S. Application No. 63/410,376 filed on Sep. 27, 2022, the entire disclosure of which is hereby incorporated by reference.

BACKGROUND

Among the sealing systems used to seal unused wire openings in seal retainers or unused terminal cavities in connector housings having a mat seal, one is shown in U.S. Pat. No. 10,044,132. Each wire opening or terminal cavity is covered by a plug that is molded into the connector housing. The plugs of the wire openings or terminal cavities that are to be populated with electrical terminals are "punched out" and removed so that the electrical terminal can be inserted. The plugs on the unpopulated wire openings or terminal cavities remain in place to seal the unpopulated wire openings or terminal cavities. The plugs may also include a post that extends into the mat seal, taking the place of a wire attached to the electrical terminal in the populated wire openings or terminal cavities.

One drawback of this sealing system is that vestiges of the plug may remain in the wire opening or terminal cavity after being punched out. These vestiges may interfere with the insertion of the electrical terminal into the wire opening or terminal cavity. Another drawback is that contact with the posts during handling and processing of the connector may cause the post to bend out of its proper position any may render the connector housing unusable for further processing. Yet another drawback is that every wire opening or terminal cavity includes a plug which increases processing time of removing many plugs when only a few wire openings or terminal cavities actually require a plug.

SUMMARY

In some aspects, a sealed electrical connector includes a seal retainer defining a plurality of wire openings, a compliant mat seal having a plurality of apertures, and a plug having a base inserted within one of the plurality of wire openings and a cylindrical post extending outwardly from the base and inserted within one of the plurality of apertures.

In some aspects of the sealed electrical connector assembly described in the preceding paragraph, the base is in a friction fit with inner walls of the one of the plurality of wire openings.

In some aspects of the sealed electrical connector assembly described in any one of the preceding paragraphs, the base defines an electrically deformable rib feature that is configured to contact at least one of the inner walls.

In some aspects of the sealed electrical connector assembly described in any one of the preceding paragraphs, the base includes an alignment key that is received within an alignment slot in the one of the plurality of wire openings and is configured to align the post with the one of the plurality of apertures.

In some aspects of the sealed electrical connector assembly described in any one of the preceding paragraphs, the base defines a tab configured to limit a depth of insertion of the base into the one of the plurality of wire openings.

In some aspects of the sealed electrical connector assembly described in any one of the preceding paragraphs, the post is visible through a cavity opening in a connector housing.

In some aspects of the sealed electrical connector assembly described in any one of the preceding paragraphs, the post has a color contrasting with the seal retainer.

In some aspects of the sealed electrical connector assembly described in any one of the preceding paragraphs, the plug defines a forward stop extending from the base configured to limit inserting depth of the base into the one of the plurality of wire openings.

In some aspects of the sealed electrical connector assembly described in any one of the preceding paragraphs, the forward stop extends between a plurality of plugs.

In some aspects of the sealed electrical connector assembly described in any one of the preceding paragraphs, the base is retained within the one of the plurality of wire openings by a semi-solid adhesive.

In some aspects, a plug retainer assembly configured to facilitate insertion of at least one of a plurality of plugs into at least one of a plurality of corresponding wire openings defined in a seal retainer includes a plug retainer to which the plurality of plugs are attached by frangible links and a first shroud configured to receive the seal retainer and sized and shaped to align the plurality of plugs with the plurality of corresponding wire openings.

In some aspects of the plug retainer assembly described in the preceding paragraph, the plug retainer assembly further includes a second shroud surrounding posts defined by the plurality of plugs.

In some aspects of the plug retainer assembly described in any one of the preceding paragraphs, the plug retainer assembly is configured to be removed from the seal retainer.

In some aspects of the plug retainer assembly described in any one of the preceding paragraphs, the plug retainer assembly is configured to be removed from the seal retainer after at least one of the frangible links is broken as the at least one of a plurality of plugs is inserted into the at least one of a plurality of corresponding wire openings.

In some aspects of the plug retainer assembly described in any one of the preceding paragraphs, the first shroud is sized and shaped to partially insert the plurality of plugs within the plurality of corresponding wire openings prior to one of the frangible links being broken.

In some aspects of the plug retainer assembly described in any one of the preceding paragraphs, a number of plugs in the plurality of plugs is an integer multiple of the number of the plurality of corresponding wire openings. The integer multiple is equal to or greater than two.

In some aspects, a method of manufacturing a sealed electrical connector, includes:
 a) providing a plug retainer to which a plurality of plugs are attached by frangible links;
 b) aligning bases of the plurality of plugs with a plurality of corresponding wire openings defined by a seal retainer; and
 c) inserting one of the bases into one of the plurality of corresponding wire openings by fracturing one of the frangible links.

In some aspects of the method described in the preceding paragraph, a friction fit is formed between the one of the bases and inner walls of the one of the plurality of corresponding wire openings during step c).

In some aspects of the method described in any one of the preceding paragraphs, the plugs each include a post extending from the base and wherein step c) is performed by inserting the one of the posts within a tubular tool and punching the tool toward the seal retainer, thereby fracturing the one of the frangible links and forming the friction fit.

In some aspects of the method described in any one of the preceding paragraphs, the method further includes partially inserting the bases of the plurality of plugs within the plurality of corresponding wire openings prior to step c).

In some aspects of the method described in any one of the preceding paragraphs, step b) is performed by inserting the seal retainer within a shroud defined by the plug retainer that is sized and shaped to align the plurality of plugs with the plurality of corresponding wire openings.

In some aspects of the method described in any one of the preceding paragraphs, the method further includes removing the seal retainer from the shroud and separating the plug retainer from the seal retainer after step c) is performed.

In some aspects of the method described in any one of the preceding paragraphs, a tubular tool is configured to weld the plug to the seal retainer using heat welding or ultrasonic welding.

BRIEF DESCRIPTION OF THE DRAWINGS

The present invention will now be described, by way of example with reference to the accompanying drawings, in which.

DETAILED DESCRIPTION

An electrical connector having plugs that are inserted into unused terminal cavities in a connector housing or retainer is presented herein. The plugs have posts that are inserted into the wire openings in a mat seal.

Figure 1:
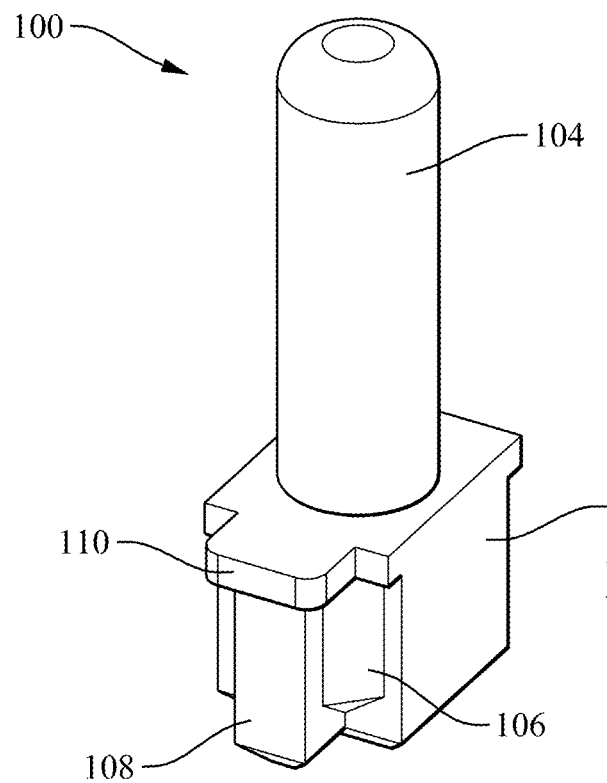
FIG. 1 shows an isometric view of a plug according to some embodiments.
Figure 2:
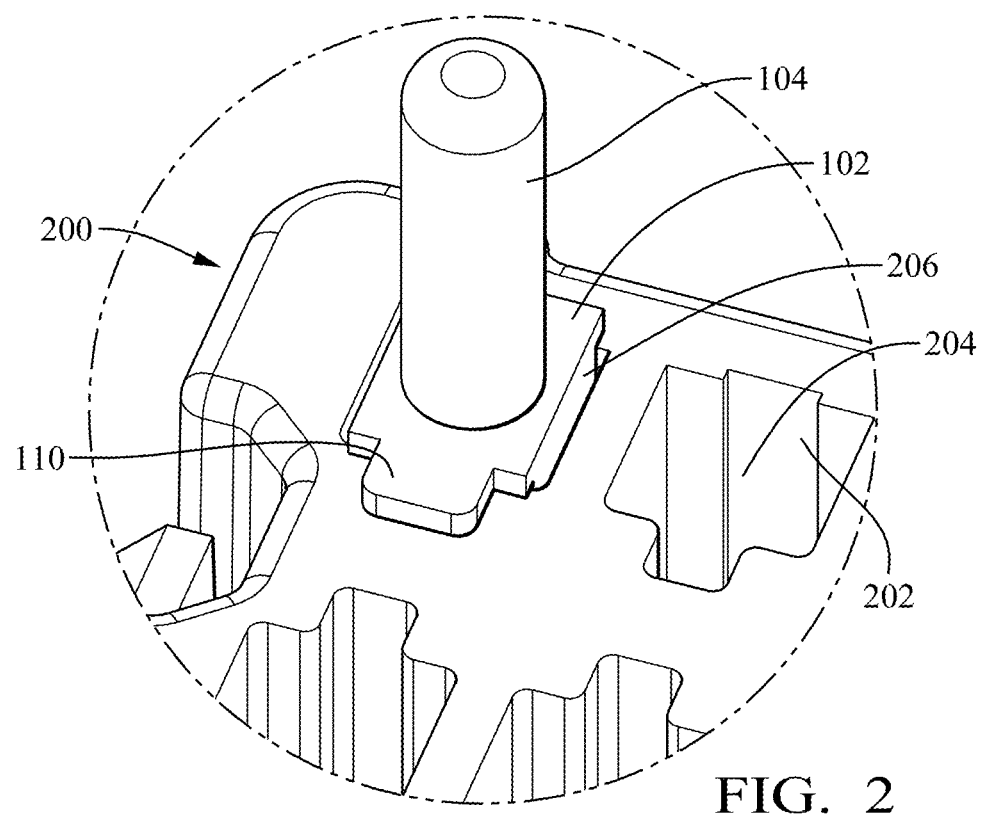
FIG. 2 shows an isometric view of a connector housing in which the plug of FIG. 1 is installed according to some embodiments.
Figure 4:
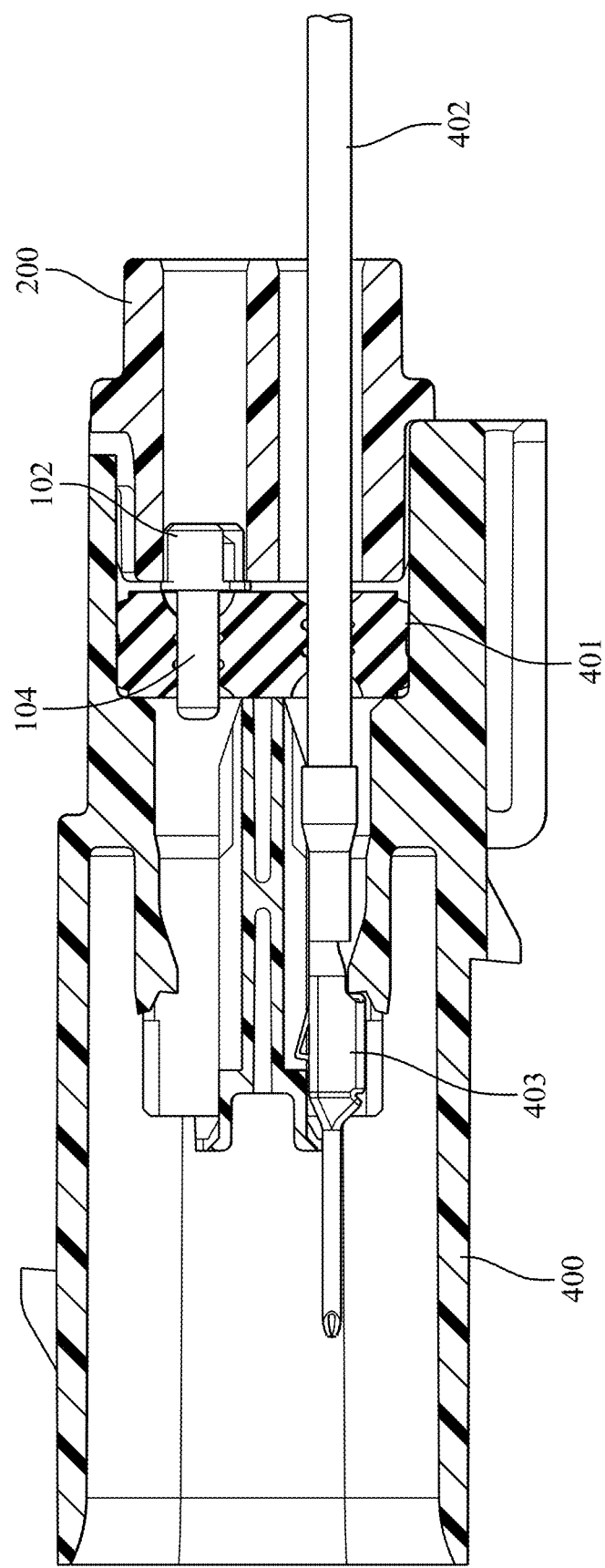
FIG. 4 shows cross-section side view of an electrical connector having the cavity retainer, the plug, a mat seal, an electrical terminal attached to a wire cable, and the connector housing according to some embodiments.

A non-limiting example of one of these plugs 100 is shown in FIG. 1. The plug 100 includes a base 102 that is inserted within an unused wire opening 202 in a seal retainer 200 as shown in FIG. 2. The base 102 is shaped and sized such that it is retained within the wire opening 202 by a friction fit between the base 102 and the inner walls 204 of the wire opening 202 of the seal retainer 200 or a connector housing. The plug 100 includes a cylindrical sealing post 104 protruding outwardly from the base 102 that is configured to be received in a mat seal 401 and take the place of a wire cable 402 extending from an electrical terminal 403 in an electrical connector housing 400 as shown in FIG. 4. The base 102 in the illustrated example includes crushable rib features 106 in order to provide the friction fit with the inner walls 204 of the wire opening 202. The base 102 also includes an alignment key feature 108 to properly orient the plug 100 in the wire opening 202 and orient the post 104 with the aperture in the mat seal 401. The base 102 further includes a forward stop feature in the form of a tab 110 that extends beyond an opening 206 of the wire opening 202 and is configured to limit the depth of insertion of the base 102 into the wire opening 202.

Figure 3:
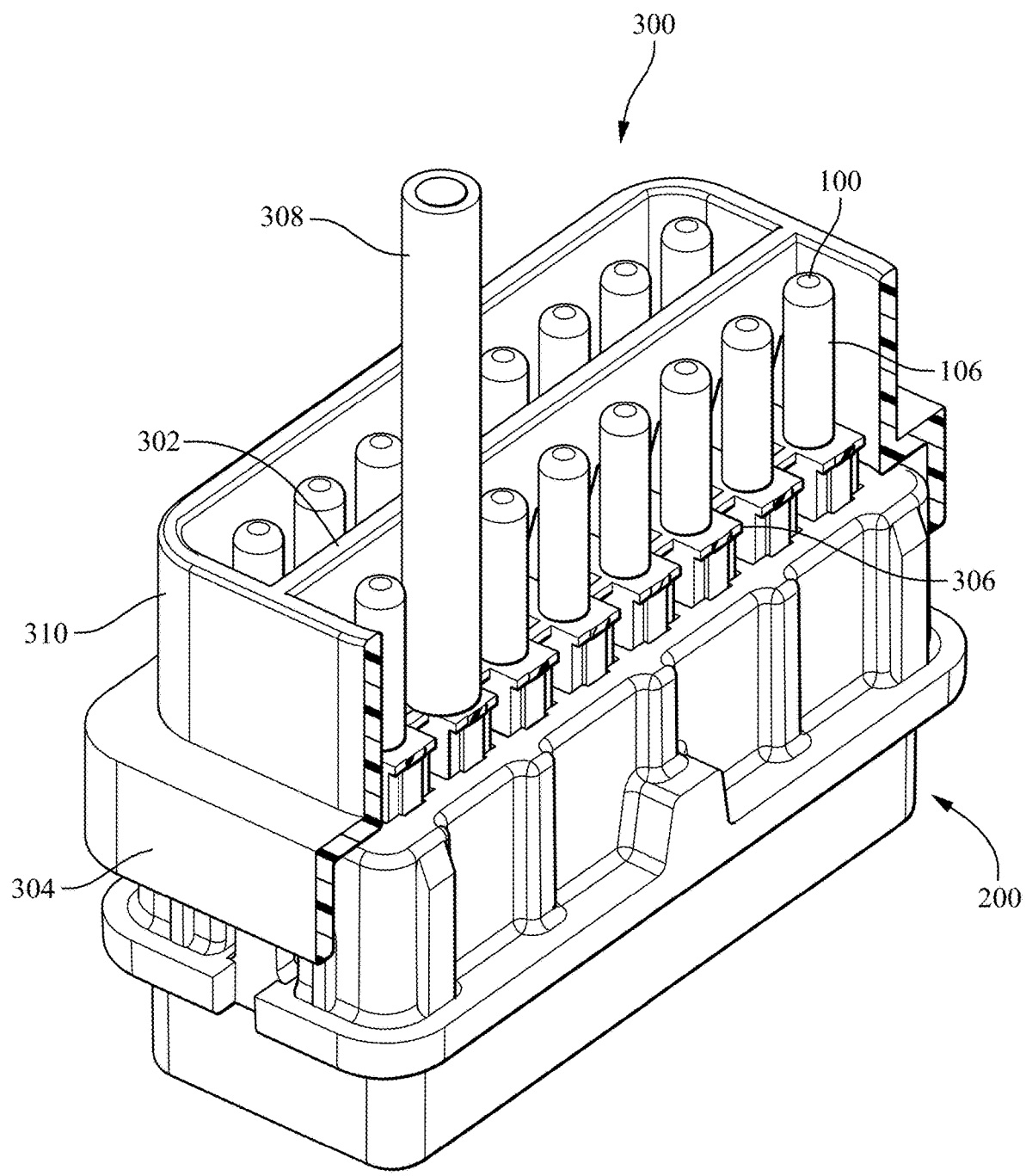
FIG. 3 shows an isometric view of a plug retainer assembly which includes multiple plugs placed on the connector housing according to some embodiments.

As shown in FIG. 3, a plug retainer assembly 300 includes multiple plugs 100 that are integrally formed with a plug retainer 302. The plug retainer assembly 300 defines a first shroud 304 that is configured to mate with the seal retainer 200. The first shroud 304 is configured to align the plugs 100 with the corresponding wire openings 202 and preferably hold the plugs 100 in a partially inserted position in the corresponding wire openings 202. The base 102 of each plug 100 is attached to the plug retainer 302 by a frangible link 306. The plugs 100 are detached from the plug retainer 302 by breaking the frangible link 306 and pushing the plugs 100 into the unpopulated wire openings 202 using a punching mechanism 308, illustrated in FIG. 3 as a hollow tube that fits over the posts 104 that is then pushed toward the seal retainer 200, thereby breaking the plug 100 free from the plug retainer 302. Any vestiges of the frangible link 306 remaining on the base 102 will help provide the friction fit and will not interfere with the open wire openings 202. After the plugs 100 are detached from the plug retainer 302 and fully inserted into the unpopulated wire openings 202, the plug retainer 302 and any unused plugs 100 still attached to the plug retainer 302 are removed from the seal retainer 200 and discarded. Preferably, the material forming the plug retainer assembly 300 is recycled. Alternatively, the plug retainer assembly 300 with unused plugs 100 may be used to seal unpopulated wire openings 202 of another seal retainer 200.

The plug retainer assembly 300 includes a second shroud 310 surrounding the plugs 100. This second shroud 310 is configured to protect the posts 104 of the plugs 100 against damage during handling and processing of the seal retainer 200. Therefore, it may be desirable to delay detaching the plug retainer assembly 300 from the seal retainer 200 until necessary to insert the posts 104 into the apertures of the mat seal 401.

The posts 104 are inserted into apertures in a mat seal 401 that is formed of a compliant material, such as a silicone rubber material. The mat seal 401 is configured to seal against the posts 104 and wires attached to the electrical terminals 403 inserted into the populated terminal cavities to inhibit environmental contaminants, such as water or dust, from entering the terminal cavities.

In an alternative embodiment, the bases may define features that engage a terminal locking feature in the terminal cavities to retain the plugs within the terminal cavities rather than being retained by a friction fit.

In another alternative embodiment, the plug retainer is a carrier strip to which the bases of the plugs are attached rather than the plug retainer 302 that mates with the electrical connector housing 400 shown in FIG. 3. This carrier strip requires less material to produce but lacks the alignment and protective features of the plug retainer assembly 300 of FIG. 3.

In another alternative embodiment, the post is long enough to be visible in the cavities through cavity openings in the front of the connector housing. Alternatively, the base is bigger and thicker than the illustrated post 104 and does not necessarily have a square or circular shape. Further, the plug could have vivid colors contrasting with the plug retainer and/or connector housing and/or other markings that may be easily identified by a human assembly operator or a vision system of an automated assembly system.

In another alternative embodiments, the assembly order in which the plug is inserted in the connector housing is connector housing→plug→mat seal→seal retainer or connector housing→mat seal→plug→seal retainer.

In another alternative embodiment, the post uses a cable seal to block a cylindrical cavity, holding the cable seal from the inside of the connector housing.

In another alternative embodiment, the forward stop extends to connect multiple plugs, resulting in a solid piece that could not be punched. This is useful when multiple cavities next to each other need to be enclosed.

In another alternative embodiment, the insertion tool is configured to weld the plug to the seal retainer using heat welding or ultrasonic welding to improve the plug's adhesion to the seal retainer.

In another alternative embodiment, the base is retained in the wire opening by a semi-solid adhesive, e.g., LOCTITE™ 248 manufactured by Henkel Corporation.

In another alternative embodiment, the plug retainer assembly has more plugs than the seal retainer or the connector housing has apertures, e.g., an integer multiple of the number of apertures. This allows the plug retainer assembly to be used to insert plugs into more than one seal retainer or connector housing, thereby reducing the handling time for the plug retainer assembly and possibly reducing the amount of material in an exhausted plug retainer assembly that needs to be disposed or recycled.

Accordingly, the sealed electrical connector, plug retainer assembly, and method of manufacturing a sealed electrical connector presented herein provides the benefits of eliminating vestiges of the plugs from inner walls of the terminal cavities that may interfere with terminal insertion. This sealed electrical connector may also reduce the time required to configure the plugs in the connector housing since only the unpopulated wire opening requiring a plug need to be processed. This sealed electrical connector further provides the benefit of protecting the posts of the plugs from being bent or dislodged prior to insertion of the electrical terminals into the terminal cavities.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A plug retainer assembly configured to facilitate insertion of at least one of a plurality of plugs into at least one of a plurality of corresponding wire openings defined in a seal retainer, comprising:
   a plug retainer to which the plurality of plugs are attached by frangible links; and
   a first shroud configured to receive the seal retainer and sized and shaped to align the plurality of plugs with the plurality of corresponding wire openings.

2. The plug retainer assembly in accordance with claim 1, further comprising a second shroud surrounding posts defined by the plurality of plugs.

3. The plug retainer assembly in accordance with claim 1, wherein the plug retainer assembly is configured to be removed from the seal retainer.

4. The plug retainer assembly in accordance with claim 3, wherein the plug retainer assembly is configured to be removed from the seal retainer after at least one of the frangible links is broken as the at least one of a plurality of plugs is inserted into the at least one of a plurality of corresponding wire openings.

5. The plug retainer assembly in accordance with claim 4, wherein the first shroud is sized and shaped to partially insert the plurality of plugs within the plurality of corresponding wire openings prior to one of the frangible links being broken.

6. The plug retainer assembly in accordance with claim 1, wherein a number of plugs in the plurality of plugs is an integer multiple of the number of the plurality of corresponding wire openings and wherein the integer multiple is equal to or greater than two.

7. A method of manufacturing a sealed electrical connector, comprising:
   a) providing a plug retainer to which a plurality of plugs are attached by frangible links;
   b) aligning bases of the plurality of plugs with a plurality of corresponding wire openings defined by a seal retainer; and
   c) inserting one of the bases into one of the plurality of corresponding wire openings by fracturing one of the frangible links.

8. The method in accordance with claim 7, wherein a friction fit is formed between the one of the bases and inner walls of the one of the plurality of corresponding wire openings during step c).

9. The method in accordance with claim 8, wherein the plugs each include a post extending from the base and wherein step c) is performed by inserting the one of the posts within a tubular tool and punching the tool toward the seal retainer, thereby fracturing the one of the frangible links and forming the friction fit.

10. The method in accordance with claim 7, further comprising partially inserting the bases of the plurality of plugs within the plurality of corresponding wire openings prior to step c).

11. The method in accordance with claim 7, wherein step b) is performed by inserting the seal retainer within a shroud defined by the plug retainer that is sized and shaped to align the plurality of plugs with the plurality of corresponding wire openings.

12. The method in accordance with claim 11, further comprising:
   removing the seal retainer from the shroud and separating the plug retainer from the seal retainer after step c) is performed.

13. The method in accordance with claim 11, wherein a tubular tool is configured to weld the plug to the seal retainer using heat welding or ultrasonic welding.

\* \* \* \* \*